(12) United States Patent
Bruchmann et al.

(10) Patent No.: US 9,303,215 B2
(45) Date of Patent: Apr. 5, 2016

(54) USE OF HYPERBRANCHED POLYESTERS AND/OR POLYESTER AMIDES FOR SEPARATING OIL-IN-WATER EMULSIONS

(71) Applicant: BASF SE, Ludwigshafen (DE)

(72) Inventors: Bernd Bruchmann, Freinsheim (DE); Andreas Eichhorn, Ellerstadt (DE); Marcus Guzmann, Mühlhausen (DE); Wolfgang Gaschler, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/684,965

(22) Filed: Nov. 26, 2012

(65) Prior Publication Data

US 2013/0087485 A1   Apr. 11, 2013

Related U.S. Application Data

(62) Division of application No. 12/682,019, filed as application No. PCT/EP2008/063238 on Oct. 2, 2008.

(30) Foreign Application Priority Data

Oct. 8, 2007   (EP) ..................... 07118028

(51) Int. Cl.
| | |
|---|---|
| C08G 63/02 | (2006.01) |
| C10G 33/04 | (2006.01) |
| B01D 17/04 | (2006.01) |
| B01D 17/00 | (2006.01) |
| C08G 63/668 | (2006.01) |
| C08G 69/44 | (2006.01) |
| C08G 83/00 | (2006.01) |
| C08G 63/688 | (2006.01) |

(52) U.S. Cl.
CPC .............. *C10G 33/04* (2013.01); *B01D 17/047* (2013.01); *B01D 17/10* (2013.01); *C08G 63/668* (2013.01); *C08G 69/44* (2013.01); *C08G 83/005* (2013.01)

(58) Field of Classification Search
CPC ........... C10G 33/04; C10G 2300/1033; B01D 17/047; B01D 17/10; C08G 63/20; C08G 63/668; C08G 64/0216; C08G 64/14; C08G 64/1616; C08G 69/44; C08G 83/005; C08G 18/44; C08G 18/71
See application file for complete search history.

(56) References Cited

U.S. PATENT DOCUMENTS

| | | | |
|---|---|---|---|
| 3,489,680 A * | 1/1970 | Snavely, Jr. ................... 516/136 |
| 4,122,073 A | 10/1978 | Georgoudis | |
| 4,440,902 A * | 4/1984 | Diery et al. ................... 525/404 |
| 4,507,466 A | 3/1985 | Tomalia et al. | |
| 4,568,737 A | 2/1986 | Tomalia et al. | |
| 4,857,599 A | 8/1989 | Tomalia et al. | |
| 4,885,110 A | 12/1989 | Bose et al. | |
| 5,445,765 A | 8/1995 | Elfers et al. | |
| 5,460,750 A | 10/1995 | Diaz-Arauzo | |
| 5,472,617 A | 12/1995 | Barthold et al. | |
| 5,846,453 A | 12/1998 | Mohr et al. | |
| 5,883,196 A | 3/1999 | Rath et al. | |
| 7,081,509 B2 | 7/2006 | Wagner et al. | |
| 7,148,293 B2 | 12/2006 | Stumbe et al. | |
| 2005/0165177 A1 | 7/2005 | Wagner et al. | |
| 2007/0100002 A1 | 5/2007 | Leinweber et al. | |
| 2008/0153931 A1 * | 6/2008 | Bruchmann et al. .......... 516/185 |
| 2010/0170142 A1 | 7/2010 | Posselt et al. | |

FOREIGN PATENT DOCUMENTS

| | | |
|---|---|---|
| CA | 2061174 A1 | 8/1992 |
| DE | 2540173 A1 | 3/1977 |
| DE | 19519042 A1 | 11/1996 |
| DE | 10163163 A1 | 7/2003 |
| DE | 10219508 A1 | 11/2003 |
| DE | 102 40 817 A1 | 3/2004 |
| DE | 10329723 B3 | 12/2004 |
| EP | 0074619 A1 | 3/1983 |
| EP | 0264841 A2 | 4/1988 |
| EP | 0267517 A2 | 5/1988 |
| EP | 0499068 A1 | 8/1992 |
| EP | 0541018 A2 | 5/1993 |
| EP | 0784645 A1 | 7/1997 |
| WO | WO-97/23474 A1 | 7/1997 |
| WO | WO-99/16810 A1 | 4/1999 |
| WO | WO-01/46296 A1 | 6/2001 |
| WO | WO-2004020503 A1 | 3/2004 |
| WO | WO-2006084816 A1 | 8/2006 |
| WO | WO-2006/103251 A1 | 10/2006 |
| WO | WO-2007039083 A1 | 4/2007 |
| WO | WO-2009112379 A1 | 9/2009 |

\* cited by examiner

*Primary Examiner* — Ling Choi
*Assistant Examiner* — Gennadiy Mesh
(74) *Attorney, Agent, or Firm* — Drinker Biddle & Reath LLP

(57) ABSTRACT

The use of a nondendrimeric hyperbranched polyester and/or a polyesteramide which comprise alkenyl-substituted succinic acid units as a demulsifier for splitting oil-water emulsions. The succinic acid is substituted by at least one alkenyl group containing from 16 to 20 carbon atoms. Particular emulsions suitable for splitting are crude oil emulsions. Also, a nondendrimeric hyperbranched polyester or a polyesteramide which comprises alkenyl-substituted succinic acid units, the alkenyl group having from 16 to 20 carbon atoms. In addition to the alkenyl-substituted succinic acid units, the nondendrimeric hyperbranched polyester contains, as further units, at least trifunctional alcohols having been alkoxylated with an average of from 3 to 12 ethylene oxide units.

18 Claims, No Drawings

USE OF HYPERBRANCHED POLYESTERS AND/OR POLYESTER AMIDES FOR SEPARATING OIL-IN-WATER EMULSIONS

CROSS REFERENCE TO RELATED APPLICATIONS

This application is a divisional application of U.S. application Ser. No. 12/682,019, filed Apr. 7, 2010, which is a National Stage of PCT/EP2008/063238 filed Oct. 2, 2008 which in turn claims priority from European Application 07118028.5 filed Oct. 8, 2007, the entire contents of all of which are incorporated herein by reference.

The invention relates to the use of nondendrimeric hyperbranched polyesters or polyesteramides which comprise alkyl- and/or alkenyl-substituted succinic acid units as demulsifiers for splitting oil-water emulsions, especially crude oil emulsions, and also nondendrimeric hyperbranched polyesters or polyesteramides which comprise alkyl- and/or alkenyl-substituted succinic acid units.

When being extracted, mineral oil is generally obtained as a relatively stable water-oil emulsion. According to the age and deposit, this may comprise up to 90% by weight of water. The water may firstly be water already present in the deposit, and secondly water which is injected into the deposit in the course of secondary and/or tertiary mineral oil extraction through injection boreholes. Generally even greater amounts of salts are dissolved in the water, for example alkali metal or alkaline earth metal salts, and the emulsion typically further also comprises solids which are discharged from the borehole with the oil-water emulsion. The water-oil emulsions are stabilized by natural emulsifiers which occur in the crude oil, for example naphthenic acids. They may also additionally be stabilized by emulsifiers which do not occur naturally, for example surfactants which have been introduced into the mineral oil deposit for tertiary mineral oil extraction and are now discharged again with the oil thus extracted.

Water, salts and solids have to be removed before the processing of the crude oil in the refinery. Refineries frequently require that the water content of the crude oil supplied must not be more than 1%. For economic reasons, the water is removed from the crude oil at the site of extraction in order to avoid the uneconomic transport of water and to prevent or at least to minimize corrosion problems.

The phase separation of the water-oil emulsion should be effected very rapidly and very completely. Only in this way, in view of the large conveying volumes, can the apparatus for phase separation, for example settling tanks, be kept at a minimum size. On extraction platforms at sea, the use of very small, compact apparatus for phase separation is a necessity in construction terms owing to the limited space, and small systems of course generally require lower capital costs than large systems. A requirement often made is that the phase separation should not take more than approx. 20 to 30 min.

To accelerate the phase separation, the use of emulsion splitters (demulsifiers) is known. Emulsion splitters are interface-active substances which influence the oil-water interfaces and thus contribute to more rapid phase separation.

Oil-water emulsions are frequently separated by a two-stage process with different requirements in each stage. In a first stage—as outlined above—the extracted emulsion is split into an oil phase and a water phase. This typically leaves small residual amounts of water in the oil phase. Provided that the water content is below a critical limit—refineries frequently require that the water content in the crude oil supplied must not be more than 1%—this is, though, generally uncritical. The water phase may also still comprise small amounts of residual oil. Since oil-containing water cannot be disposed of uncleaned in the event of exceedance of the limits, there usually follows a deoiling step in which residual amounts of oil are also removed from the water phase. For this purpose, it is also possible to use demulsifiers; in general, however, different demulsifiers are used than in the actual emulsion splitting.

EP-A 0 264 841 describes the use of linear copolymers composed of hydrophobic acrylic esters or methacrylic esters and hydrophilic ethylenically unsaturated monomers as mineral oil emulsion splitters.

EP-A 0 499 068 describes the preparation of reaction products of vinylic monomers and alcohol alkoxylates or phenol alkoxylates and their use as demulsifiers for crude oil emulsions.

U.S. Pat. No. 5,460,750 describes reaction products of phenol resins and alkylene oxides as emulsion splitters for crude oil emulsions.

EP-A 0 541 018 describes emulsion splitters prepared from polyethyleneimines having a weight-average molecular weight of up to 35 000 g/mol and ethylene oxide and propylene oxide, and a second active component used additionally is an alkylphenol-formaldehyde resin.

EP-A 0 784 645 describes the preparation of alkoxylates of polyamines, especially of polyethyleneimines and polyvinylamines, and their use as crude oil emulsion splitters.

EP-A 0 267 517 discloses branched polyamino esters as demulsifiers. The branched polyamino esters are obtained by reacting alkoxylated primary amines with triols and dicarboxylic acids.

In addition, dendrimeric polymers have been described as demulsifiers for crude oil. U.S. Pat. Nos. 4,507,466 and 4,857,599 disclose dendrimeric polyamido amines. U.S. Pat. No. 4,568,737 discloses dendrimeric polyamido amines and hybrid dendrimers formed from polyamido amines, polyesters and polyethers, and their use as demulsifiers for crude oil. DE 103 29 723 describes the preparation of alkoxylated dendrimeric polyesters and their use as biodegradable emulsion splitters. The dendrimeric polyesters used are based on a polyfunctional alcohol as the core molecule and a carboxylic acid which has at least two hydroxyl groups as a structural component. Dendrimers are prepared in multistage reactions, which is accordingly very costly and inconvenient. Such products are therefore very expensive and hardly usable in an economically viable manner in industrial scale applications.

WO 2006/084816 relates to the use of hyperbranched polymers as demulsifiers for splitting crude oil emulsions. Various types of hyperbranched polymers are disclosed, for example hyperbranched polycarbonates, hyperbranched polyethers, hyperbranched polyurethanes, hyperbranched polyamides, hyperbranched polyesters or hyperbranched polyesteramides. The units of hyperbranched polyesters and hyperbranched polyesteramides which are disclosed are also succinic acid, 2-methylsuccinic acid, 2-ethylsuccinic acid and 2-phenylsuccinic acid. However, alkyl- and alkylenesuccinic acids with a longer alkyl or alkenyl chain are not disclosed.

In addition to the requirement for rapid and complete separation, it should be considered that the composition of the mineral oil can vary from oilfield to oilfield, and that the composition of the extracted oil-water emulsion can also change in the course of time. It is consequently necessary to adjust the demulsifier to the particular use. Frequently, mixtures of different demulsifiers are used for this purpose.

It was an object of the present invention to provide improved demuisifiers for splitting oil-water emulsions, in particular crude oil emulsions, with which more rapid phase separation can be achieved. These should be simple and inexpensive to prepare and be adjustable to different requirements in a simple manner according to the building block principle.

The object is achieved by the use of nondendrimeric hyperbranched polyesters or polyesteramides which comprise, as monomer units, alkyl- and/or alkenyl-substituted succinic acid units as demuisifiers for splitting oil-water emulsions, especially for splitting crude oil emulsions.

Accordingly, the use of nondendrimeric hyperbranched polyesters and/or polyesteramides at least comprising dicarboxylic acid units (A) and, as further units, at least trifunctional alcohols (B1) and/or aminoalcohols (B2) which have at least one amino group and at least two OH groups for splitting oil-water emulsions, in particular crude oil emulsions, has been found, wherein the polymers comprise, as dicarboxylic acid units, substituted succinic acid units (I)

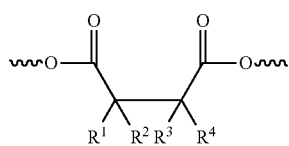

and/or substituted succinic ester amide units (II)

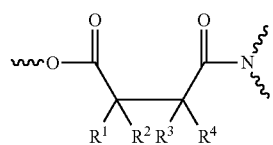

where $R^1$, $R^2$, $R^3$ and $R^4$ are each independently H, a $C_3$- to $C_{40}$-alkyl radical or a $C_3$- to $C_{40}$-alkenyl radical, with the proviso that at least one of the $R^1$, $R^2$, $R^3$ and $R^4$ radicals is not H.

In a preferred embodiment of the invention, hyperbranched polyesters are used.

In a further preferred embodiment of the invention, the at least trifunctional alcohols (B1) are polyetherols with ethylene oxide and/or propylene oxide units.

In addition, the corresponding nondendrimeric hyperbranched polyesters and polyesteramides of the above formulae have been found, With regard to the invention, the following should be stated specifically:

To perform the invention, hyperbranched polyesters and/or polyesteramides are used as demulsifiers.

Dendrimeric and hyperbranched polymers are terms for polymers which are notable for a highly branched structure and a high functionality. However, there are nevertheless significant differences in structure between dendrimers and hyperbranched polymers.

Dendrimers are molecularly homogeneous macromolecules with a highly symmetric structure. Dendrimers can, proceeding from a central molecule, be prepared by controlled stepwise linkage of in each case two or more di- or polyfunctional monomers to each already bonded monomer. Each linkage step multiplies the number of monomer end groups (and hence of linkages) by the factor of 2 or higher, and monodisperse polymers which are built up generation by generation and have treelike structures, ideally spherical, whose branches each comprise exactly the same number of monomer units, are obtained, Owing to this perfect structure, the polymer properties are advantageous: for example, a surprisingly low viscosity and a high reactivity are observed owing to the high number of functional groups on the sphere surface. However, the preparation of the monodisperse dendrimers is complicated by the need to introduce protecting groups and remove them again in each linkage step, and by the requirement for intensive purifying operations before the start of each new growth stage, which is why dendrimers are typically prepared only on the laboratory scale.

In contrast, hyperbranched polymers are both molecularly and structurally inhomogeneous, i.e. the molecules of the polymer have a distribution both with regard to the molecular weight and with regard to the structure of the molecules. They are obtained by being built up in a non-generational manner. It is therefore also not necessary to isolate and to purify intermediates. Hyperbranched polymers can be obtained by simple mixing of the components required to form them and the reaction thereof in a so-called one-pot reaction. Hyperbranched polymers may have dendrimeric substructures. In addition, though, they also have linear polymer chains and inhomogeneous polymer branches.

Especially suitable for the synthesis of hyperbranched polymers are so-called $AB_x$ monomers. These have two different functional groups A and B in one molecule, which can react with one another in an intermolecular manner to form a bond. The functional A group is present only once per molecule and the functional B group twice or more than twice. The reaction of said $AB_x$ monomers with one another forms uncrosslinked polymers with regularly arranged branching sites. The polymers have almost exclusively B groups at the chain ends.

Moreover, hyperbranched polymers can be prepared via the $A_x+B_y$ synthesis route. In this case, $A_x$ and $B_y$ represent two different monomers with the functional groups A and B, and the indices x and y the number of functional groups per monomer. In the $A_x+B_y$ synthesis, illustrated here by the example of an $A_2+B_3$ synthesis, a difunctional monomer $A_2$ is reacted with a trifunctional monomer $B_3$. This initially forms a 1:1 adduct of A and B with an average of one functional A group and two functional B groups, which can then likewise react to give a hyperbranched polymer. The hyperbranched polymers thus obtained also have predominantly B groups as end groups.

The nondendrimeric hyperbranched polymers used in accordance with the invention differ from dendrimeric polymers significantly in the degree of branching. The degree of branching DB of the polymers in question is defined as $$DB(\%) = \frac{T+Z}{T+Z+L} \times 100,$$

where T is the mean number of terminally bound monomer units, Z is the mean number of monomer units forming branches and L is the mean number of linearly bound monomer units in the macromolecules of the particular polymers. For the definition of the "Degree of Branching", see also H. Frey et al., Acta Polym. 1997, 48, 30.

In the context of the invention, the feature "hyperbranched" in connection with the polymers means that the degree of branching DB is from 10 to 95%, preferably 25-90% and more preferably from 30 to 80%.

A dendrimer, in contrast, has the maximum possible number of branching sites, which can be achieved only by a highly symmetric structure. In connection with the present invention, the polymers are "dendrimeric", in contrast, when their degree of branching DB=99-100%. For the definition of dendrimeric and hyperbranched polymers, see also P. J. Flory, J. Am. Chem. Soc. 1952, 74, 2718 and H. Frey et al., Chem. Eur, J. 2000, 6, No. 14, 2499, According to the invention, hyperbranched polyesters and/or polyesteramides are used as demulsifiers, i.e. nondendrimeric polymers in the sense of the above definition, i.e. molecularly and structurally inhomogeneous polymers. In a known manner, the polyesters have ester linkages, while the polyesteramides, as well as ester linkages, additionally have amide linkages. The polymers comprise, as structural units, in each case at least one dicarboxylic acid unit (A) and at least one trifunctional alcohol (B1) and/or at least one trifunctional amino alcohol (B2). They may additionally comprise further structural units.

The hyperbranched polyesters and/or polyesteramides used as demulsifiers in accordance with the invention comprise, as dicarboxylic acid units, substituted succinic acid units (I)

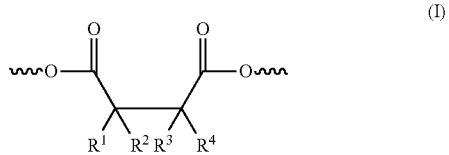

and/or substituted succinic ester amide units (II)

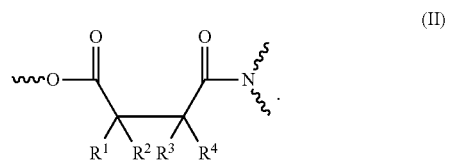

In these structures, $R^1$, $R^2$, $R^3$ and $R^4$ are each independently H, a $C_3$- to $C_{40}$-alkyl radical or a $C_3$- to $C_{40}$-alkenyl radical, with the proviso that at least one of the $R^1$, $R^2$, $R^3$ and $R^4$ radicals is not H. The radicals are preferably alkenyl radicals.

The alkyl radicals may be linear or branched. They are preferably $C_4$ to $C_{30}$ radicals, more preferably $C_6$ to $C_{28}$ radicals, even more preferably $C_8$ to $C_{26}$ radicals and, for example, $C_{10}$ to C20 radicals. The alkyl chains are more preferably linear. For example, they may be butyl, pentyl, hexyl, heptyl, octyl, decyl, dodecyl, tetradecyl, hexadecyl, octadecyl or isooctadecyl radicals. They are preferably decyl, dodecyl, tetradecyl, hexadecyl, octadecyl or isooctadecyl radicals. If the radicals are branched, preferably not more than one branch should be present per 3 carbon atoms of the radical, more preferably not more than one branch per 4 carbon atoms of the radical.

Alkenyl radicals have one or else more than one double bond. They are preferably alkenyl radicals having one double bond. The alkenyl radicals may be linear or branched. If the radicals are branched, preferably not more than one branch per 3 carbon atoms of the radical should be present, preferably not more than one branch per 4 carbon atoms of the radical. They are preferably $C_4$ to $C_{30}$ radicals, more preferably $C_8$ to $C_{28}$ radicals, even more preferably $C_8$ to $C_{26}$ radicals and, for example, $C_{10}$ to $C_{20}$ radicals.

The alkenyl radicals may preferably be n- or isohexenyl, n- or isoheptenyl, n- or isooctenyl, n- or isooctadienyl, n- or isononenyl, n- or isodecenyl, n- or isododecenyl, n- or isotetradecenyl, n- or isohexadecenyl, n- or isooctadecenyl or tetrapropenyl radicals.

The alkenyl radicals are more preferably n- or isooctenyl, n- or isododecenyl, n- or isotetradecenyl, n- or isohexadecenyl, n- or isooctadecenyl or tetrapropenyl radicals.

Preferably, two or three of the $R^1$, $R^2$, $R^3$ and $R^4$ radicals are each H, and, more preferably, three of the radicals are each H, i.e. the succinic acid unit has only one alkyl or alkenyl group. The one substituent may be in the $R^1$ or $R^3$ position.

To synthesize the hyperbranched polyesters or polyesteramides, substituted succinic acid can be used in the manner described. However, the succinic acid can preferably be used in the form of activated derivatives, especially in the form of halides, esters or anhydrides.

Derivatives are especially the anhydrides in question in monomeric or else polymeric form, mono- or dialkyl esters, preferably mono- or di-$C_1$-$C_4$-alkyl esters, more preferably mono- or dimethyl esters or the corresponding mono- or diethyl esters, and also mono- and divinyl esters and mixed esters, preferably mixed esters with different $C_1$-$C_4$-alkyl components, more preferably mixed methyl ethyl esters.

Particular preference is given to using succinic anhydrides as the starting material. In addition to the high reactivity of the anhydrides, the use of the anhydrides has the advantage that alkenylsuccinic anhydrides can be prepared in a particularly simple and inexpensive manner by reacting maleic anhydride with olefins which have a hydrogen atom in the allyl position (the so-called ene reaction). Reaction of linear α-olefins can afford alkenylsuccinic anhydrides with n-alkenyl radicals; isomerized olefins with nonterminal double bonds give rise to succinic anhydrides substituted by isoalkenyl radicals. The olefins used may also be reactive oligo- or polyolefins, though preference is given to not using any reactive polyisobutenes. The preparation of alkenylsuccinic anhydrides (also known as ASAs) by means of the ene reaction is described in detail, for example, in WO 97/23474 or DE 195 19 042 and the literature cited therein.

Succinic anhydrides which are substituted by alkenyl groups and are used with preference are n- or isohexenylsuccinic anhydride, n- or isoheptenylsuccinic anhydride, n- or isooctenylsuccinic anhydride, n- or isooctadienylsuccinic anhydride, n- or isononenylsuccinic anhydride, n- or isodecenylsuccinic anhydride, n- or isododecenyl-succinic anhydride (DDSA), n- or isotetradecenylsuccinic anhydride, n- or isohexa-decenylsuccinic anhydride, n- or isooctadecenylsuccinic anhydride, tetrapropenyl-succinic anhydride, 2-dodecenyl-3-tetradecenylsuccinic anhydride. It will be appreciated that it is also possible to use mixtures of different substituted anhydrides.

Particularly preferred products are n- or isooctenylsuccinic anhydride, n- or isododecenylsuccinic anhydride (DDSA), n- or isotetradecenylsuccinic anhydride, n- or isohexadecenylsuccinic anhydride, n- or isooctadecenylsuccinic anhydride, tetrapropenylsuccinic anhydride or mixtures of the products mentioned.

The alkenylsuccinic acids or derivatives or mixtures thereof can also be used in a mixture with alkylsuccinic acids or derivatives thereof.

To prepare the hyperbranched polyesters or polyesteramides used in accordance with the invention, the alkyl- and/or alkenyl-substituted succinic acids (A1) or derivatives thereof are reacted with a) at least one at least trifunctional aliphatic, cycloaliphatic, araliphatic or aromatic alcohol (B1), and/or b) with an amino alcohol (B2) which has at least one amino group and at least two hydroxyl groups, the ratio of the reactive groups in the reaction mixture being selected so as to establish a molar ratio of OH groups and/or amino groups to carboxyl groups or derivatives thereof of from 5:1 to 1:5, preferably from 4:1 to 1:4, more preferably from 3:1 to 1:3 and most preferably from 2:1 to 1:2.

When (B1) is used, hyperbranched polyesters are formed; when (B2) is used alone or in a mixture with (B1), hyperbranched polyesteramides are formed.

The at least trifunctional alcohols (B1) have generally from 3 to 8 OH groups, preferably from 3 to 6, more preferably from 3 to 4 and most preferably 3 OH groups. The at least trifunctional alcohols (B1) are preferably aliphatic or cycloaliphatic alcohols, more preferably aliphatic alcohols.

The at least trifunctional alcohols (B1) may, for example, be glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol or higher condensation products of glycerol, di(trimethylolpropane), di(pentaerythritol), tris(hydroxymethyl)isocyanurate, tris(hydroxyethyl) isocyanurate (THEIC), tris(hydroxypropyl) isocyanurate, glyceryl esters of ricinoleic acid (castor oil), inositols or sugars, for example glucose, fructose or sucrose, sugar alcohols, for example sorbitol, mannitol, threitol, erythritol, adonitol(ribitol), arabitol(lyxitol), xylitol, dulcitol(galactitol), maltitol or isomaltitol. It will be appreciated that it is also possible to use mixtures of a plurality of different at least trifunctional alcohols (B1).

Preferred at least trifunctional alcohols (B1) are glycerol, diglycerol, triglycerol, trimethylolethane, trimethylolpropane, 1,2,4-butanetriol or pentaerythritol, and particular preference is given to glycerol and trimethylolpropane.

In a particularly advantageous embodiment of the invention, the at least trifunctional alcohols (B1) are trifunctional or higher-functionality polyetherols which can be obtained in a manner known in principle by alkoxylating trifunctional or higher-functionality alcohols with ethylene oxide, propylene oxide and/or butylene oxide. The alkoxylation can preferably be effected with ethylene oxide and/or propylene oxide and more preferably with ethylene oxide or a mixture of ethylene oxide and propylene oxide. The mixed ethoxylated/propoxylated polyetherols may be copolymers in which the ethylene oxide units are distributed randomly in the chain, or they may be block copolymers. The number and the selection of the alkylene oxide units, especially of ethylene oxide units, can be used to control the hydrophilicity of the hyperbranched polyesters. While the alkyl- or alkenyl-substituted succinic acid units have hydrophobic character by their nature, the selection of alkoxylated alcohols, especially of ethoxylated alcohols, allows hydrophilic molecular moieties to be incorporated.

Preference is given to at least trifunctional polyetherols based on glycerol, diglycerol, triglycerol, trimethylolethane, trimethylolpropane, 1,2,4-butanetriol or pentaerythritol, which have been alkoxylated with an average of from 1 to 50 ethylene oxide and/or propylene oxide units. Preferably at least 50% of the alkylene oxide units are ethylene oxide units, and preferably only ethylene oxide units are used. The mean number of ethylene oxide and/or propylene oxide units per starter molecule is preferably from 2 to 40, more preferably from 3 to 30 and most preferably from 4 to 25. Particular preference is given to polyetherols based on glycerol and trimethylolpropane which have an average of from 4 to 25 ethylene oxide units in each case.

Suitable amino alcohols (alkanolamines) (B2) having at least one amino group and at least two hydroxyl groups are preferably dialkanolamines and trialkanolamines.

Useful dialkanolamines are, for example, those of the formula (III)

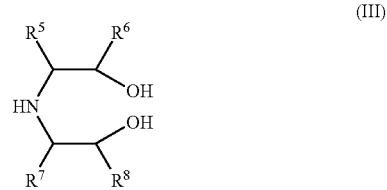

where $R^5$, $R^6$, $R^7$ and $R^8$ are each independently hydrogen, $C_{1-6}$-alkyl, $C_{3-12}$-cycloalkyl or $C_{6-14}$-aryl (including aryalkyl).

Examples of suitable dialkanolamines comprise diethanolamine, dipropanolamine, diisopropanolamine, 2-amino-1,3-propanediol, 3-amino-1,2-propanediol, 2-amino-1,3-propanediol, dibutanolamine, diisobutanolamine, bis(2-hydroxy-1-butyl)amine, bis(2-hydroxy-1-propyl)amine and dicyclohexanolamine.

Suitable trialkanolamines are those of the formula (IV)

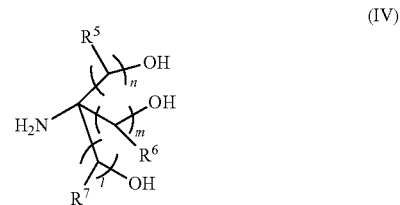

where $R^5$, $R^6$ and $R^7$ are each as defined in formula (III), and l, m and n are each independently integers from 1 to 12. For example, tris(hydroxymethyl)aminomethane is suitable.

The amino alcohol used is preferably diethanolamine (DEA), dipropanolamine, diisopropanolamine (DIPA), dibutanolamine or mixtures thereof.

In addition to the components mentioned, it is optionally also possible to use further components for the synthesis of the hyperbranched polymers used in accordance with the invention. Such components can be used to influence the properties of the polymers and adjust them optimally to the desired purpose.

For instance, in addition to the alkyl- and/or alkenyl-substituted succinic acid (A1) or derivatives thereof, it is possible to use further di- or polyfunctional carboxylic acids (A2). Examples of further carboxylic acids comprise malonic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or derivatives thereof, especially the anhydrides or esters thereof. The amount of such further carboxylic acids should, though, generally not exceed 50 mol % based on the amount of all carboxylic acids (A) used together. The amount of alkyl- and/or alkenyl-substituted succinic acid (A1) is preferably at least 75 mol %, more preferably at least 90 mol %, and very particular preference is given to using only alkyl- and/or alkenyl-substituted succinic acids (A1).

In addition, as well as components (B1) or (B2), it is also possible to use difunctional aliphatic, cycloaliphatic, araliphatic or aromatic alcohols (B3). The suitable selection of dihydric alcohols can be used to influence the properties of the polyesters or polyesteramides.

Examples of diols (B3) comprise ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecane-diol, 1,5-hexadiene-3,4-diol, 1,2- and 1,3-cyclopentanediols, 1,2-, 1,3- and 1,4-cyclo-hexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, 2-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n≥4, polyethylene polypropylene glycols where the sequence of the ethylene oxide and of the propylene oxide units may be blockwise or random, polytetramethylene glycols, preferably having a molar mass up to 5000 g/mol, poly-1,3-propanediols, preferably having a molar mass up to 5000 g/mol, polycaprolactones or mixtures of two or more representatives of the above compounds. One or else both hydroxyl groups in the aforementioned diols may be substituted by SH groups. Diols used with preference are ethylene glycol, 1,2-propanediol, 1,3-propanediol, 1,4-butanediol, 1,5-pentanediol, 1,6-hexanediol, 1,8-octanediol, 1,2-, 1,3- and 1,4-cyclohexanediol, 1,3- and 1,4-bis(hydroxymethyl)cyclohexane, and also diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n≥4, polyethylene polypropylene glycols where the sequence of the ethylene oxide and of the propylene oxide units may be blockwise or random, or polytetramethylene glycols, preferably up to a molar mass up to 5000 g/mol.

The dihydric alcohols (B3) may optionally also comprise further functionalities, for example carbonyl, carboxyl, alkoxycarbonyl or sulfonyl functions, for example dimethyloipropionic acid or dimethylolbutyric acid, and also their $C_1$-$C_4$-alkyl esters, glyceryl monostearate or glyceryl monooleate.

The bifunctional compounds used may, as well as components (B1) and/or (B2), optionally also be aliphatic, cycloaliphatic, araliphatic or aromatic amino alcohols (B4) which have one OH group and one amino group. For example, monoethanolamine can be used.

The amount of such further dihydric alcohols (B3) or amino alcohols (B4) should, though, generally not exceed 50 mol % based on the amount of all alcohols or amino alcohols (A) used together. The amount of dihydric alcohols (B3) is preferably not more than 45 mol %, more preferably not more than 40 mol %, and very particular preference is given to using only components (B1) and (B2), The reaction of all components (A) and (B) can be carried out in the presence or absence of a solvent. Suitable solvents are, for example, hydrocarbons such as paraffins, aromatics, ethers and ketones. However, preference is given to performing the reaction free of solvent.

The reaction is effected generally at elevated temperatures, for example from 30 to 250° C., especially from 80 to 220° C. and more preferably from 80 to 180° C.

The water formed during the polymerization (polycondensation) or the alcohols should be removed from the reaction medium by means of suitable measures. The reaction can be effected, for example, in the presence of a water-removing agent as an additive which is added at the start of the reaction. Suitable examples are molecular sieves, especially 4 Å molecular sieve, anhydrous $MgSO_4$ or anhydrous $Na_2SO_4$. In addition, alcohols or water formed during the reaction can be distilled off. This can also be done by means of a suitable azeotroping agent using a water separator. The distillative removal can preferably be effected under reduced pressure, for example at a pressure of from 1 mbar to 500 mbar.

The reaction can be carried out in the absence of catalysts. However, preference is given to working in the presence of at least one catalyst. These are preferably acidic inorganic, organometallic or organic catalysts, or mixtures of a plurality of acidic inorganic, organometallic or organic catalysts.

Acidic inorganic catalysts in the context of the present invention include, for example, sulfuric acid, sulfates and hydrogensulfates, such as sodium hydrogensuffate, phosphoric acid, phosphonic acid, hypophosphorous acid, aluminum sulfate hydrate, alum, acidic silica gel (pH≤6, especially ≤5) and acidic aluminum oxide. Additionally are, for example, aluminum compounds of the general formula $Al(OR^1)_3$ and titanates. Preferred acidic organometallic catalysts are, for example, dialkyltin oxides or dialkyltin esters. Preferred acidic organic catalysts are acidic organic compounds with, for example, phosphate groups, sulfonic acid groups, sulfate groups or phosphonic acid groups. It is also possible to use acidic ion exchangers as acidic organic catalysts.

If a catalyst is used, its amount is typically from 1 to 5000 and preferably from 10 to 1000 ppm by weight, based on the sum of all components (A) and (B).

The reaction time is typically from 5 minutes to 48 hours, preferably from 30 min to 24 hours and more preferably from 1 hour to 10 hours, The end of the reaction can often be recognized by the fact that the viscosity of the reaction mixture suddenly starts to rise rapidly. When the viscosity rise begins, the reaction can be stopped, for example by cooling. Thereafter, the carboxyl group number in the (pre)polymer can be determined on a sample of the mixture, for example by titration of the acid number to DIN 53402-2.

According to the type of monomers used, the reaction of the monomers forms ester bonds and/or amide bonds. The resulting hyperbranched polyesters or polyester-amides are essentially uncrosslinked. In the context of this invention, essentially uncrosslinked means that a degree of crosslinking of less than 15% by weight, preferably of less than 10% by weight, determined via the insoluble content of the polymer, is present. The insoluble content of the polymer was determined by extraction for four hours with the same solvent as is used for the gel permeation chromatography, i.e. tetrahydrofuran, dimethylacetamide or hexafluoroisopropanol, according to the solvent in which the polymer has better solubility, in a Soxhiet apparatus and, after drying the residue to constant weight, weighing the remaining residue.

The preparation of the polymers can preferably be carried out batchwise, but also continuously, for example in stirred vessels, tubular reactors, tower reactors or other customary reactors which may be equipped with static or dynamic mixers, and customary apparatus for pressure and temperature control and for working under inert gas.

When working without solvent, the end product is generally obtained directly and, if required, can be purified by customary purifying operations. When a solvent has also been used, it can typically be removed from the reaction mixture after the reaction, for instance by vacuum distillation.

The preparation is notable for its great simplicity. It enables the preparation of hyperbranched polyesters or polyesteramides in a simple one-pot reaction. The isolation or purification of intermediates or protecting groups for intermediates is not required.

Further details of the preparation of hyperbranched polyesters or polyesteramides are given, for example, in WO 01/46296, DE 101 63 163, DE 102 19 508, DE 102 40 817 or WO 99/16810.

Useful demulsifiers have been found to be hyperbranched polyesters or polyesteramides with a weight-average molecular weight $M_w$ of from 1000 to 500 000 g/mol, preferably from 2000 to 300 000 g/mol, more preferably from 5000 to 250 000 g/mol and especially from 10 000 to 200 000 g/mol.

The polydispersity of the polyesters or polyesteramides used in accordance with the invention is generally from 1.2 to 50, preferably from 1.4 to 40, more preferably from 1.5 to 30 and most preferably from 2 to 30. The polydispersity data and the number-average and weight-average molecular weight data $M_n$ and $M_w$ are based here on gel permeation chromatography analyses, using polymethyl methacrylate as the standard and tetrahydrofuran, dimethylacetamide or hexafluoroisopropanol as the eluent. The method is described in Analytiker Taschenbuch [Analyst's Handbook], Volume 4, pages 433 to 442, Berlin 1984.

The type of terminal groups can be influenced by the ratio of the monomers used. If predominantly OH-terminated polymers are to be obtained, the alcohols should be used in excess. If predominantly COOH-terminated polymers are to be obtained, the carboxylic acids should be used in excess.

The number of free OH groups (hydroxyl number) of the polyesteramide end product is generally from 10 to 500 mg, preferably from 20 to 450 mg of KOH per gram of polymer and can be determined, for example, by titration to DIN 53240-2.

The number of free COOH groups (acid number) of the polyesteramide end product is generally from 0 to 400, preferably from 0 to 200 mg of KOH per gram of polymer and can likewise be determined by titration to DIN 53240-2.

The hyperbranched polyesters or polyesteramides used in accordance with the invention generally have at least 4 functional groups. There is in principle no upper limit in the number of functional groups. However, products having too high a number of functional groups frequently have undesired properties, for example poor solubility or a very high viscosity. The hyperbranched polymers used in accordance with the invention therefore generally have not more than 100 functional groups. The hyperbranched polymers preferably have from 8 to 30 and more preferably from 8 to 20 functional groups.

The COOH, OH and/or amino groups originally present in the hyperbranched polyesters or polyesteramides can be transfunctionalized with suitable compounds by polymer-analogous reaction. In this manner, it is possible to adjust the polyesters or polyesteramides to the end use desired in each case.

The hyperbranched polyesters or polyesteramides can be transfunctionalized during the preparation of the polymers, immediately after the polymerization reaction or in a separate reaction.

When components which, as well as COOH, OH or amino groups, have further functional groups are added before or during the formation of the polymer, a hyperbranched polymer with statistically distributed further functional groups other than the original groups is obtained.

For subsequent transfunctionalization, at least difunctional compounds which comprise firstly the desired functional group to be newly introduced and also a second group which is capable of reaction with the original groups of the hyperbranched polyester or polyesteramide used as a starting material to form a bond can be used. One example of this is the reaction of an OH group with an alkyl or aryl isocyanate to generate hydrophobic groups, or the reaction of a COOH group with an epoxy compound, for example glycidyl methacrylate, to form a reactive acrylic double bond.

Examples of suitable functional groups which can be introduced by means of suitable reactants comprise especially acidic or basic groups having hydrogen atoms and derivatives thereof, such as —OC(O)OR, —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, —NHCONHR, without any intention that the list be restricted thereto. If appropriate, the functional groups can also be converted to the corresponding salts with the aid of suitable acids or bases. The R radicals of said groups are generally straight-chain or branched alkyl radicals or aryl radicals which may also have further substitution. For example, they are $C_1$-$C_{30}$-alkyl radicals or $C_5$-$C_{12}$-aryl radicals. It is also possible to use other functional groups, for example —CN or —OR.

For the use of the hyperbranched polymers as demulsifiers, it may be advantageous when hydrophilic and hydrophobic molecular moieties are in a particular ratio relative to one another. The ratio can be influenced firstly by the selection of the monomers used.

For hydrophobization, it is possible to polymerize, for example, difunctional or higher functionality monomers having hydrophobic groups into the polyesters or polyesteramides. To this end, it is possible to use, for example, difunctional or higher-functionality alcohols, difunctional or higher-functionality amines or difunctional or higher-functionality carboxylic acids. Examples of such monomers comprise alcohols such as hexanediol, octanediol, decanediol, dodecanediol, octadecanediol, amines such as hexamethylenediamine, octanediamine, dodecanediamine, or acids such as adipic acid, octanedioic acid, dodecanedioic acid or octadecanedioic acid.

However, the hydrophobization can also be effected subsequently by using monofunctional hydrophobic compounds with which reactive groups present are modified before, during or after the polymerization. For instance, the inventive polymers can be hydrophobized, for example, by reaction with monofunctional saturated or unsaturated aliphatic or aromatic amines, alcohols, carboxylic acids, epoxides or isocyanates.

The hydrophilicity of the polyesters or polyesteramides used can be enhanced by, for example, subsequently reacting terminal hydroxyl or amino groups by reaction with alkylene oxides, especially ethylene oxide. In addition, the hydrophilicity can be enhanced by the use, already described above, of polyether polyols as a monomer.

It is also possible to synthesize hyperbranched polyesters or polyesteramides which have different kinds of functionalities. This can be done, for example, by reacting with a mixture of different compounds for transfunctionalization, or else by converting only a portion of the functional groups originally present. In addition, it is possible to obtain mixed-functionality compounds by using monomers of the ABC or AB$_2$C type for the polymerization, where C is a functional group which is not reactive with A or B under the selected reaction conditions.

The hyperbranched polyesters or polyesteramides are already biodegradable owing to the content of alkyl- and alkenylsuccinic acids. The biodegradability can generally be enhanced by, in the case of use of further monomer units, employing monomers which are known to be biodegradable or can be assumed to be biodegradable. Suitable further monomers comprise glycerol, glyceryl alkoxylates, ethylene glycol, stearyl alcohol, oleyl alcohol, castor oil and/or derivatives thereof, if appropriate in combination with oxalic acid, malonic acid, succinic acid, lactic acid, tartaric acid, adipic acid, stearic acid, oleic acid, linoleic acid, linolenic acid or ricinoleic acid, without any intention that the list be restricted to these products.

The hyperbranched polyesters and/or polyesteramides prepared are, in accordance with the invention, used to split oil-water emulsions, especially crude oil emulsions. The oil-water emulsions may be either water-in-oil or oil-in-water emulsions. The oil-water emulsions may comprise, for example, from 0.1 to 99% by weight of water or salt water. The inventive demulsifiers for separating oil-water emulsions can preferably be used with a water or salt water content of from 1 to 98% by weight, more preferably from 5 to 97% by weight and most preferably from 10 to 95% by weight. The oil components may be oil components of any origin.

The hyperbranched polyesters and/or polyesteramides are added to the oil-water emulsions, especially the crude oil emulsions, for splitting preferably in dissolved form. In this case, polymer concentrations in the solution of from 10 to 90% by weight have been found to be useful. The solvents used preferably include water, alcohols such as methanol, ethanol, propanol, isopropanol, butanol, ethers such as tetrahydrofuran or dioxane, paraffinic solvents such as hexane, cyclohexane, heptane, octane, isooctane or light petroleum fractions, or aromatic solvents such as toluene, xylene or Solvent Naphtha.

The amount (in ppm by weight) of the polyester(s) and/or polyesteramide(s) used in accordance with the invention, based on the oil content of the crude oil emulsion, is generally from 0.1 ppm to 5000 ppm, preferably from 1 ppm to 3000 ppm, more preferably from 2 ppm to 1000 ppm and especially from 5 ppm to 500 ppm.

Systems and apparatus for splitting crude oil emulsions are known to those skilled in the art. The emulsion is typically split on site, i.e. still at the oil field. The system may be a system on one production borehole or be a central system in which the splitting of the crude oil emulsions is undertaken for several production boreholes of an oil field together.

Even at the temperature of the freshly extracted crude oil emulsion, the splitting proceeds at such a speed that the emulsion can be split as early as on the way to the processing plant. This broken emulsion is then separated into pure oil and water or saltwater in an optionally heated separator and possibly with the aid of an electrical field. The separator may be a system which separates only under the influence of gravity, i.e., for example, a settling tank, or another separator, for example a hydrocyclone.

The crude oil emulsion is separated generally at 10-130° C., preferably at 40-90° C.

Since crude oils consist of a mixture of many chemical compounds, it is generally necessary, owing to the different chemical composition of the oil, the water contents and salt contents and the specific conditions of emulsion splitting, such as temperature, duration of emulsion splitting, type of metered addition and interactions with further components of the mixture, to adjust the demulsifier to the specific conditions. A corresponding selection of hyperbranched polyesters and/or polyesteramides is undertaken by the person skilled in the art according to the separation problem. According to the invention, particularly the hyperbranched polyesters are useful, especially those based on at least trifunctional polyetherols.

The hyperbranched polyesters and/or polyesteramides used in accordance with the invention can be adjusted to the particular separating problem, for example, by appropriate selection of the monomers or subsequent functionalization. Advantageously, it is also possible for this purpose to use mixtures of different hyperbranched polyesters and/or polyesteramides. For example, by varying the ratio of hydrophobic and hydrophilic molecular moieties, a series of products of different hydrophilicity can be synthesized. Adjustment to the specific separation problem can be effected easily by changing only the ratio of two or more polyesters and/or polyesteramides.

In addition, the hyperbranched polyesters and/or polyesteramides used in accordance with the invention can of course also be used in a mixture with other crude oil demulsifiers. Further crude oil demulsifiers may, for example, be oxyalkylated phenol-formaldehyde resins, EO/PO block copolymers or EO/PO block copolymers crosslinked with adipic acid, crosslinked diepoxides, polyamides or alkoxylates thereof, salts of sulfonic acids or ethoxylated and/or propoxylated polyethyleneimines. Preference may be given to using EO/PO block copolymers, EO/PO block copolymers esterified with adipic acid, or ethoxylated and/or propoxylated polyethyleneimines. Corresponding crude oil demulsifiers are disclosed, for example, in DE 25 40 173 or EP 541 018 B1. Particularly advantageously, the hyperbranched polyesters and/or polyesteramides used in accordance with the invention can also be combined with proteins for emulsion splitting, especially with hydrophobins. Further details of hydrophobins as emulsion splitters are disclosed by WO 2006/103251.

The invention is illustrated in detail by the examples which follow.

EXAMPLES 1 TO 11

Preparation of Hyperbranched Polyesters

A glass flask equipped with stirrer, internal thermometer and distillation unit was initially charged with alkenylsuccinic anhydride and alcohol (molar anhydride to alcohol ratio=1:1) and also dibutyltin dilaurate as a catalyst (200 ppm based on the mass of the acid anhydride), which were heated to 160° C., and water of reaction which formed was removed by distillation. After stirring for 2 h, the mixture was heated slowly to 180° C., the pressure was reduced to 40 mbar and further water of reaction was removed by distillation. After the end of the reaction, the product was cooled and analyzed.

The reaction times at 180° C. and the feedstocks are compiled in Table 1.

The resulting products were analyzed by means of gel permeation chromatography. The eluent used was tetrahydrofuran or dimethylacetamide; the standard used was polymethyl methacrylate (PMMA).

EXAMPLES 12 AND 13

Preparation of Polyesteramides

A glass flask equipped with stirrer, internal thermometer and distillation unit was initially charged with alkenylsuccinic anhydride and dibutyltin dilaurate as a catalyst (300 ppm based on the mass of the acid anhydride), which were heated to 60° C. Subsequently, the amino alcohol (molar anhydride to amino alcohol ratio=1:1) was added dropwise within 20 min, in the course of which the mixture heated up to 110° C. After the addition had ended, the reaction mixture was heated to 150° C., the pressure was reduced slowly to 150 mbar owing to foam formation, and the water of reaction which formed was removed by distillation. After 0.5 h of reaction time at 150° C., the product was cooled and analyzed. The feedstocks and the analytical data are compiled in Table 1.

The resulting products were analyzed by means of gel permeation chromatography. The eluent used was tetrahydrofuran, the standard polymethyl methacrylate (PMMA).

COMPARATIVE EXAMPLE 1

For comparison, a hyperbranched polycarbonate according to Example 1 from WO 2006/084816 was used.

COMPARATIVE EXAMPLES 2 TO 4

For comparison, a hyperbranched polyester with adipic acid as the dicarboxylic acid unit, synthesized according to Examples 12 to from WO 2006/084816, was used.

A crude oil emulsion from Wintershall AG, Emlichheim, Sonde 87, with a water content of 55% by volume, was heated to a temperature of 52° C. in a vessel which had not been sealed tightly in a water bath for approx. 2 h.

The crude oil emulsion was homogenized by shaking for approx. 30 sec, then in each case 100 ml of the oil emulsion were introduced into a 100 ml shaking cylinder. The oil-filled shaking cylinders were introduced into the water bath.

An Eppendorf pipette was used to meter 50 µl in each case of the 5% by weight solution of the polymer to be tested into the shaking cylinder containing crude oil emulsion, and the cylinder was sealed with the glass stopper (25 mg of polymer/l of emulsion; approx. 250 ppm). Thereafter, the shaking cylinder was taken out of the water bath, shaken 60 times and depressurized. The shaking cylinder was then placed back into the water bath and the timer was started. The volume of the water which now separates out was read off after 10, 20, 30, 60, 120 and 240 min. The results are compiled in Table 2.

TABLE 1

Feedstocks and end products (— means: reaction not at 180° C.)

| Example | Feedstocks | Reaction time at 180° C., [h] | $M_n$ [g/mol] | $M_w$ [g/mol] | $M_w/M_n$ |
|---|---|---|---|---|---|
| 1 | ASA 12 + Glyc | 2 | 1170 | 11 100 | 9.5 |
| 2 | ASA 16/18 + Glyc | 4.5 | 3450 | 89 000 | 25.8 |
| 3 | ASA 18 + Glyc | 5 | 3850 | 107 000 | 27.8 |
| 4 | ASA 18 + TMP | 8 | 3100 | 68 800 | 22.2 |
| 5 | ASA 18 + TMP × 3 EO | 4 | 2270 | 41 500 | 18.3 |
| 6 | ASA 18 + TMP × 12 EO | 6 | 4100 | 44 000 | 10.7 |
| 7 | ASA 18 + TMP × 12 EO | 8 | 3200 | 93 200 | 29.1 |
| 8 | ASA 18 + Glyc × 5 EO | 2 | 1830 | 16 800 | 9.2 |
| 9 | ASA 18 + Glyc × 5 EO | 3 | 2640 | 31 800 | 12.0 |
| 10 | ASA 18 + Glyc × 5 EO | 5 | 4250 | 96 000 | 21.2 |
| 11 | ASA 18 + Castor oil | 8 | 2700 | 25 100 | 9.3 |
| 12 | ASA 18 + Diethanolamine | — | 1000 | 2500 | 2.5 |
| 13 | ASA 18 + Dilsopropanolamine | — | 1200 | 3800 | 3.2 |
| C1 | Polycarbonate | — | 2400 | 5400 | 2.3 |
| C2 | Polyester with adipic acid | — | 2900 | 20 300 | 7 |
| C3 | Polyester with adipic acid | — | 2100 | 32 000 | 15.2 |
| C4 | Polyester with adipic acid | — | 800 | 5900 | 7.4 |

Index of Abbreviations:
Glyc=glycerol
TMP=trimethylolpropane
EO=ethylene oxide
Glyc×n EO=glycerol, randomly ethoxylated with n ethylene oxide units
TMP×n EO=trimethylolpropane, randomly ethoxylated with n ethylene oxide units
ASA 12=$C_{12}$-alkenylsuccinic anhydride
ASA 16/18=mixture of $C_{16}$- and $C_{18}$-alkenylsuccinic anhydride
ASA 18=$C_{18}$-alkenylsuccinic anhydride Test of the Hyperbranched Polymers for Splitting Crude Oil-water Emulsions Testing of the suitability of the inventive polymers as a demulsifier by measuring the splitting of water out of a crude oil emulsion.

5 g of the polymer to be tested were weighed into a 100 ml standard flask which was made up to the mark with 3:1 xylene/isopropanol mixture (based on volume), and the polymer was dissolved therein by shaking.

TABLE 2

Results of the tests of separation of crude oil emulsions

| Example No. | Water splitting in ml | | | | | |
|---|---|---|---|---|---|---|
| | 10 min | 20 min | 30 min | 60 min | 120 min | 240 min |
| 1 | 0 | 3 | 14 | 40 | 46 | 50 |
| 2 | 1 | 7 | 25 | 43 | 47 | 51 |
| 3 | 1 | 8 | 26 | 44 | 48 | 51 |
| 4 | 1 | 5 | 14 | 42 | 47 | 50 |
| 5 | 1 | 15 | 24 | 42 | 46 | 50 |
| 6 | 1 | 17 | 29 | 50 | 52 | 54 |
| 7 | 7 | 20 | 34 | 50 | 52 | 54 |
| 8 | 5 | 18 | 30 | 44 | 49 | 52 |
| 9 | 7 | 25 | 44 | 49 | 52 | 54 |
| 10 | 6 | 25 | 43 | 51 | 52 | 54 |
| 11 | 0 | 3 | 4 | 13 | 26 | 38 |
| 12 | 0 | 1 | 3 | 10 | 20 | 33 |
| 13 | 0 | 2 | 4 | 11 | 22 | 37 |
| C1 | 1 | n.d. | 8 | 13 | 28 | 44 |
| C2 | 0 | n.d. | 5 | 13 | 47 | 55 |
| C3 | 2 | n.d. | 8 | 16 | 40 | 54 |
| C4 | 1 | n.d. | 8 | 14 | 34 | 48 |

The examples and comparative examples show that the hyperbranched polyesters and polyesteramides used in accordance with the invention achieve good separation results. Particularly advantageous are polyesters, and very particularly advantageous are polyesters which have been synthesized on the basis of polyetherols as the alcohol component. While the results are also satisfactory with hyperbranched polyesters based on adipic acid (Examples C2 to C4) after 240 min, the hyperbranched polyesters based on substituted succinic acids have significant advantages at shorter times. Even after 10 or 20 min, a significant separation effect is achieved and the separation is substantially complete as early as after 60 min.

The invention claimed is:

1. A method of splitting an oil-water emulsion, comprising adding a nondendrimeric hyperbranched polyester at least comprising dicarboxylic acid units (A) and, as further units, at least trifunctional alcohols (B1) to the oil-water emulsion, wherein the nondendrimeric hyperbranched polyester comprises, as dicarboxylic acid units, substituted succinic acid units (I)

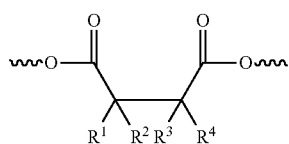

(I)

wherein two or three of the $R^1$, $R^2$, $R^3$ and $R^4$ radicals are H, and the remaining radicals are each $C_{16}$-$C_{20}$-alkenyl radicals, and the at least trifunctional alcohols (B1) are trifunctional or higher-functionality polyetherols selected from the group of glycerol, diglycerol, triglycerol, trimethylolethane, trimethylolpropane, 1,2,4-butanetriol and pentaerythritol, said alcohols having been alkoxylated with an average in each case of from 3 to 12 ethylene oxide units;

wherein the polyester has a weight average molecular weight $M_w$ from 16,800 to 96,000 g/mol and a polydispersity of 2 to 30.

2. The method according to claim 1, wherein $R^1$ and/or $R^3$ is a $C_{16}$ to $C_{20}$-alkenyl radical.

3. The method according to claim 2, wherein $R^1$ or $R^3$ is a radical selected from the group consisting of n- or isohexadecenyl, and n- or isooctadecenyl radicals.

4. The method according to claim 1, wherein the nondendrimeric hyperbranched polyester is used in a concentration of from 5 ppm to 500 ppm based on the oil-water emulsion to be split.

5. The method according to claim 1, wherein the emulsion is a crude oil emulsion.

6. The method according to claim 5, wherein the crude oil emulsion is split at temperatures from 40 to 90 ° C.

7. The method according to claim 1, wherein the nondendrimeric hyperbranched polyester is added in dissolved form.

8. The method according to claim 1, further comprising separating the oil and the water in a separator.

9. The method according to claim 8, wherein the separator is heated.

10. The method according to claim 8, wherein the separation is performed with the aid of an electrical field.

11. The method according to claim 8, wherein the separator is a system which separates under the influence of gravity.

12. The method according to claim 11, wherein the separator is a hydrocyclone-2.

13. The method according to claim 1, wherein two of the $R^1$, $R^2$, $R^3$ and $R^4$ radicals are $C_{16}$-$C_{20}$-alkenyl radicals.

14. The method according to claim 1, wherein one of the $R^1$, $R^2$, $R^3$ and $R^4$ radicals is a $C_{16}$-$C_{20}$-alkenyl radical.

15. The method according to claim 1, wherein one of the $R^1$, $R^2$, $R^3$ and $R^4$ radicals is a $C_{16}$-$C_{18}$-alkenyl radical and the other three are H.

16. A method of splitting an oil-water emulsion, comprising adding a nondendrimeric hyperbranched polyester at least comprising dicarboxylic acid units (A) and, as further units, at least trifunctional alcohols (B1) to the oil-water emulsion, wherein the nondendrimeric hyperbranched polyester has a weight-average molecularw eight of from 16,800 to 96,000 g/mol and comprises, as dicarboxylic acid units, substituted succinic acid units (I)

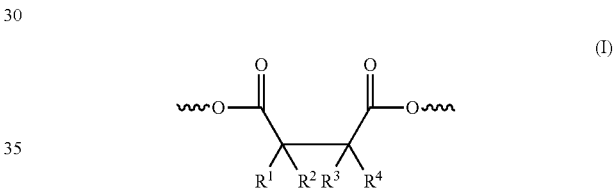

(I)

wherein two or three of the $R^1$, $R^2$, $R^3$ and $R^4$ radicals are H, and the remaining radicals are each $C_{16}$-$C_{18}$-alkenyl radicals, and the at least trifunctional alcohols (B1) are trifunctional or higher-functionality polyetherols selected from the group of glycerol, diglycerol, triglycerol, trimethylolethane, trimethylolpropane, 1,2,4-butanetriol and pentaerythritol, said alcohols having been alkoxylated with an average in each case of from 3 to 12 ethylene oxide units.

17. The method according to claim 1, wherein two or three of the $R^1$, $R^2$, $R^3$ and $R^4$ radicals are H, and the remaining radicals are each $C_{18}$-$C_{20}$-alkenyl radicals.

18. The method according to claim 1, wherein three of the $R^1$, $R^2$, $R^3$ and $R^4$ radicals are H, and the remaining radical is a $C_{18}$-alkenyl radical.

* * * * *